United States Patent
Buermann et al.

(10) Patent No.: US 9,253,943 B2
(45) Date of Patent: Feb. 9, 2016

(54) METHOD FOR OPERATING A SELF-PROPELLED HARVESTING MACHINE, AND SELF-PROPELLED HARVESTING MACHINE

(71) Applicant: CLAAS SELBSTFAHRENDE ERNTEMASCHINEN GMBH, Harsewinkel (DE)

(72) Inventors: Dominik Buermann, Verl (DE); Martin Kohlhase, Harsewinkel (DE); Udo Beschorn, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 88 days.

(21) Appl. No.: 14/177,719

(22) Filed: Feb. 11, 2014

(65) Prior Publication Data
US 2014/0295922 A1    Oct. 2, 2014

(30) Foreign Application Priority Data
Feb. 14, 2013    (DE) .......................... 10 2013 101 444

(51) Int. Cl.
*A01D 41/14* (2006.01)
*A01D 41/02* (2006.01)
*A01D 41/06* (2006.01)

(52) U.S. Cl.
CPC ................ *A01D 41/02* (2013.01); *A01D 41/06* (2013.01); *A01D 41/141* (2013.01)

(58) Field of Classification Search
CPC ... A01D 41/14; A01D 41/141; A01D 41/148; A01D 57/00; A01D 57/04; A01D 41/145; A01D 41/02; A01D 41/06

USPC ................ 56/10.2 E, 10.2 R, 208, 14.5, 314; 701/23, 25, 50, 99
See application file for complete search history.

(56) References Cited

U.S. PATENT DOCUMENTS

| | | | |
|---|---|---|---|
| 4,204,383 A * | 5/1980 | Milliken, Jr. ............... | 56/10.2 E |
| 4,845,931 A * | 7/1989 | Bruner et al. ................. | 56/208 |
| 5,752,372 A * | 5/1998 | Buermann ................ | 56/10.2 E |
| 6,292,729 B2 * | 9/2001 | Falck et al. ..................... | 701/50 |
| 6,651,411 B1 * | 11/2003 | Becker et al. .............. | 56/10.2 R |
| 7,730,707 B2 * | 6/2010 | Pietricola et al. ............... | 56/221 |
| 7,866,132 B2 * | 1/2011 | Killen et al. ............... | 56/10.2 E |
| 7,869,922 B2 * | 1/2011 | Otto et al. ....................... | 701/50 |
| 2009/0107094 A1 | 4/2009 | Bich et al. | |

FOREIGN PATENT DOCUMENTS

EP        2 055 173        5/2009

* cited by examiner

*Primary Examiner* — Robert Pezzuto
(74) *Attorney, Agent, or Firm* — Michael J. Striker

(57) ABSTRACT

A method for operating a self-propelled harvesting machine with a plurality of working assemblies for processing picked-up crop, includes controlling the working assemblies using a control device assigned to the harvesting machine. At least one working assembly of the working assemblies is controlled by an input mechanism operatively connected to the control device and having a specific first function (F1) in the harvesting mode. A second function (F2), which deviates from the first function (F1) is assigned to the input mechanism by the control device depending on an operating state change. The second function (F2) is specific for the working assembly in an operating state that deviates from the harvesting mode.

9 Claims, 5 Drawing Sheets

METHOD FOR OPERATING A SELF-PROPELLED HARVESTING MACHINE, AND SELF-PROPELLED HARVESTING MACHINE

CROSS-REFERENCE TO A RELATED APPLICATION

The invention described and claimed hereinbelow is also described in German Priority Document DE 10 2013 101444.5, filed on Feb. 14, 2013. The German Priority Document, the subject matter of which is incorporated herein by reference, provides the basis for a claim of priority of invention under 35 U.S.C. 119(a)-(d).

BACKGROUND OF THE INVENTION

The invention relates to a method for operating a self-propelled harvesting machine and to a self-propelled harvesting machine comprising a plurality of working assemblies for processing picked-up crop and controlled by a control device, where in at least one of the working assemblies is controlled by input means operatively connected to the control device with a specific first function (F1) in the harvesting mode.

Document EP 2 055 173 A1 makes known a related method for operating a self-propelled harvesting machine, i.e., a method for controlling a header on a self-propelled combine harvester with a control system making it possible to position the reel and finger bar in relation to one another. To this end, the changes in the position of the reel and the finger bar are monitored and evaluated by the control system in order to automatically implement a correcting motion in order to maintain the existing relation of the positioning thereof with respect to one another. The control system comprises a plurality of input means, which are specific for the movement of the finger bar and used to position the finger bar in the horizontal direction within a range of motion. The reel can be positioned in the horizontal and vertical directions by further specific input means. The input means are actuated by an operator, who controls the position of the reel and the finger bar depending on the crop type and harvesting conditions. When the header is set down on a trailer intended therefor, in order to be transported, the reel and the finger bar must be transferred into a position defined for the permissible transport, in order to retain the transport width that is permitted for travel on the road.

In order to transfer the finger bar into the aforementioned position, the operator must control the control system by actuating the particular input means for the reel and the finger bar accordingly. It is not always ensured that the operator will transfer the header into the transport position (for example if he is not paying attention or has become comfortable) and, therefore, a plurality of problems can result. If the reel has not been lowered and/or retracted, or if the finger bar has not been retracted, the trailer or the header itself may become damaged, for example. Furthermore, hydraulic oil remains in the oil circuit of the header, which may not be present in the oil circuit of the combine harvester.

SUMMARY OF THE INVENTION

The present invention overcomes the shortcomings of known arts, such as those mentioned above.

To that end, the present invention provides a method for operating a self-propelled harvesting machine and, a self-propelled harvesting machine that are characterized by greater operator comfort.

In an embodiment, the invention provides a method for operating a self-propelled harvesting machine comprising a plurality of working assemblies for processing picked-up crop and controlled by a control device, where in at least one of the working assemblies is controlled by input means operatively connected to the control device with a specific first function (F1) in the harvesting mode, where a second function (F2), which deviates from the first function (F1), is assigned to the input means (31) by the control device (28) depending on an operating state change and where this second function (F2) is specific for the working assembly (3) in an operating state that deviates from the harvesting mode.

The advantage of a temporary assignment of the second function instead of the first function assigned to the input means, wherein both functions are specific for the working assembly, is that the number of input means required to implement the two functions in order to control the working assembly is limited, and that prevention of operator errors is ensured due to this multiple assignment because the functions are assigned in an assembly-specific manner and are oriented to the particular operating state.

Preferably, the working assembly is controlled by the second function such that the working assembly is automatically transferred into a working position or a transport position or parked position. The working assembly is transferred into one of the two positions by a simple actuation of the input means, wherein it is ensured that individual components of the working assembly in the transport position assume positions relative to one another that permit safe transport on the road. Reference is made, for example, to a front attachment, which can be attached to the harvesting machine and which is accommodated by a trailer for travel on the road.

In order to ensure that none of the components of the front attachment extends beyond the permissible transport width, the components are automatically transferred into the appropriate transport position thereof after the input means is actuated. An operator of the harvesting machine no longer needs to make certain that the components of the front attachment are transferred into the transport position thereof, by manually actuating corresponding input means for the particular components in a targeted manner, before the front attachment is set down on the trailer. It also is possible thereby to prevent the trailer from becoming damaged by the front attachment being set down thereon. A further advantage is that of the automatic transfer into the transport position or parked position, since, during the approach to the transport position, a constant flow through the hydraulic cylinder is ensured, thereby ensuring that the pistons are guided in a parallel manner.

Preferably, the duration of actuation of the input means for the transfer into one of the two positions (either the working position or the transport position), is determined depending on the ground speed of the harvesting machine. Under the aspect of operating safety, the required duration of actuation of the input means is determined depending on the ground speed after the second function is assigned. To this end, a speed limit value is stored in the control device, with which the current ground speed is compared. If this speed limit value is exceeded, all that is required is a one-time actuation of the input means in order to initiate the automatic transfer of the working assembly into the transport position or the working position. On the other hand, if the ground speed of the harvesting machine falls below this speed limit value, the input means must be actuated in a sustained manner in order to transfer the working assembly into the transport position or the working position.

The duration of actuation of the input means is monitored for this purpose. By monitoring the duration of actuation, it is ensured that an interruption of the sustained actuation of the input means results in an immediate interruption of the transfer of the working assembly into the transport position or the working position.

In particular, the working assembly is automatically transferred into the working position that was stored by the control device as the last working position of the working assembly. This contributes to increased operator comfort.

Furthermore, sensors are used for monitoring to determine when the working position or the transport position is reached. The operator is notified accordingly when the working position or the transport position is reached. Sensors that are already present on the header can be used for this purpose, such as the sensors used to control the reel height or the sensors used to monitor the longitudinal displacement of the header table. The sensor signals are evaluated by the control device. Any malfunctions can therefore be identified and indicated by signaling.

Advantageously, when the working position or the transport position is reached and the input means are actuated, the first function is assigned to the input means. In this manner, it is ensured that the second function, which was assigned to the input means, is automatically replaced by the first function that was stored originally. The operator therefore automatically has access once more to the functions that are essential to the operation of the working assembly.

In a harvesting machine of the invention, a second function, which deviates from the first function, is assigned to the input means by the control device depending on an operating state change. The second function is specific for the working assembly in an operating state that deviates from the harvesting mode. The second function is used to transfer the working assembly into a working position or a transport position.

In particular, the executability of the second function is dependent on the ground speed of the harvesting machine. As a result, hazardous situations that result upon automatic actuation of the working assembly can be avoided.

Preferably, the harvesting machine can be embodied as a combine harvester and, the working assembly can be a header.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiment obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
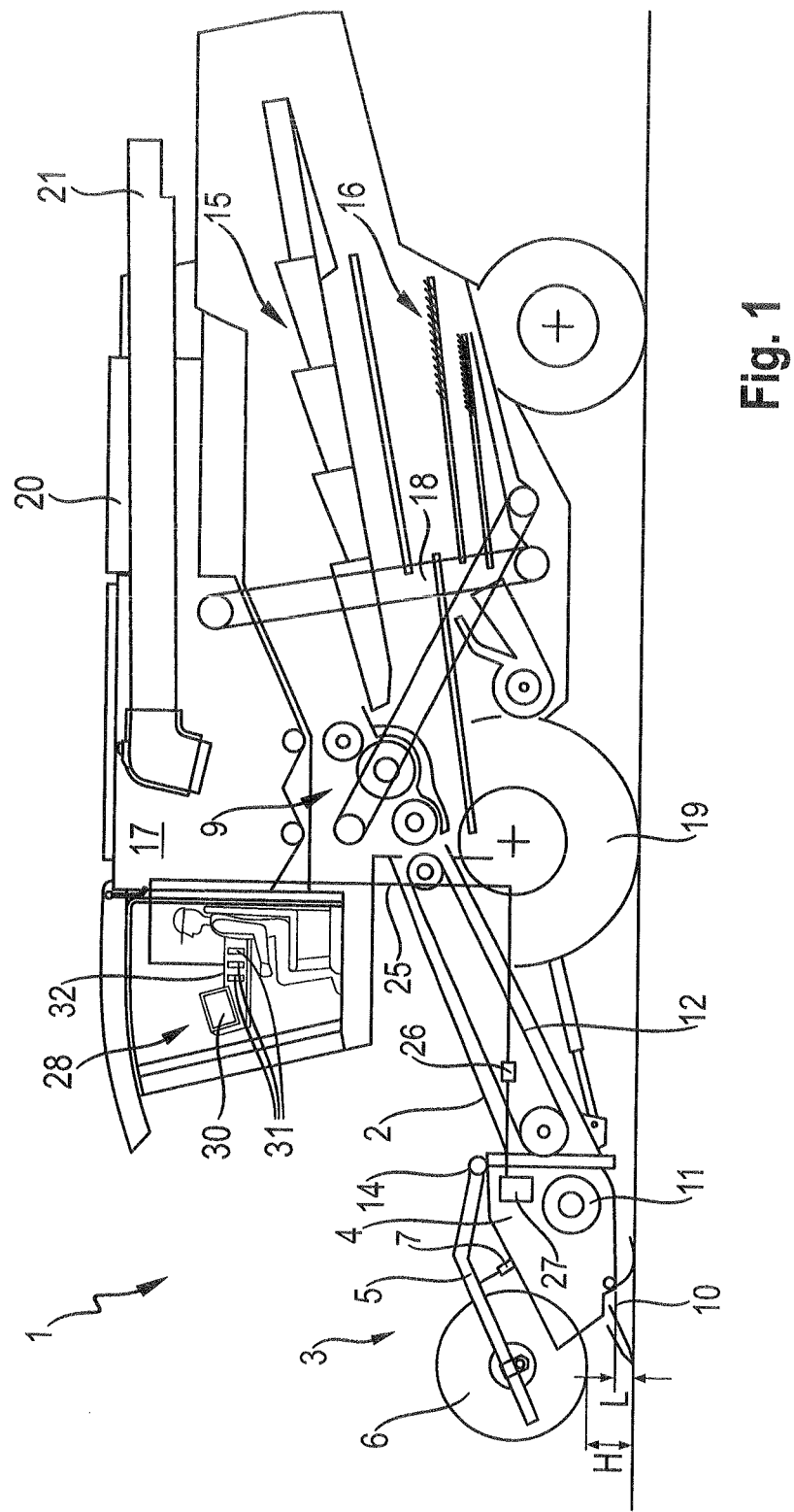
FIG. 1 presents a schematic side view of a self-propelled harvesting machine, constructed to operate according to the inventive principles.
Figure 2:
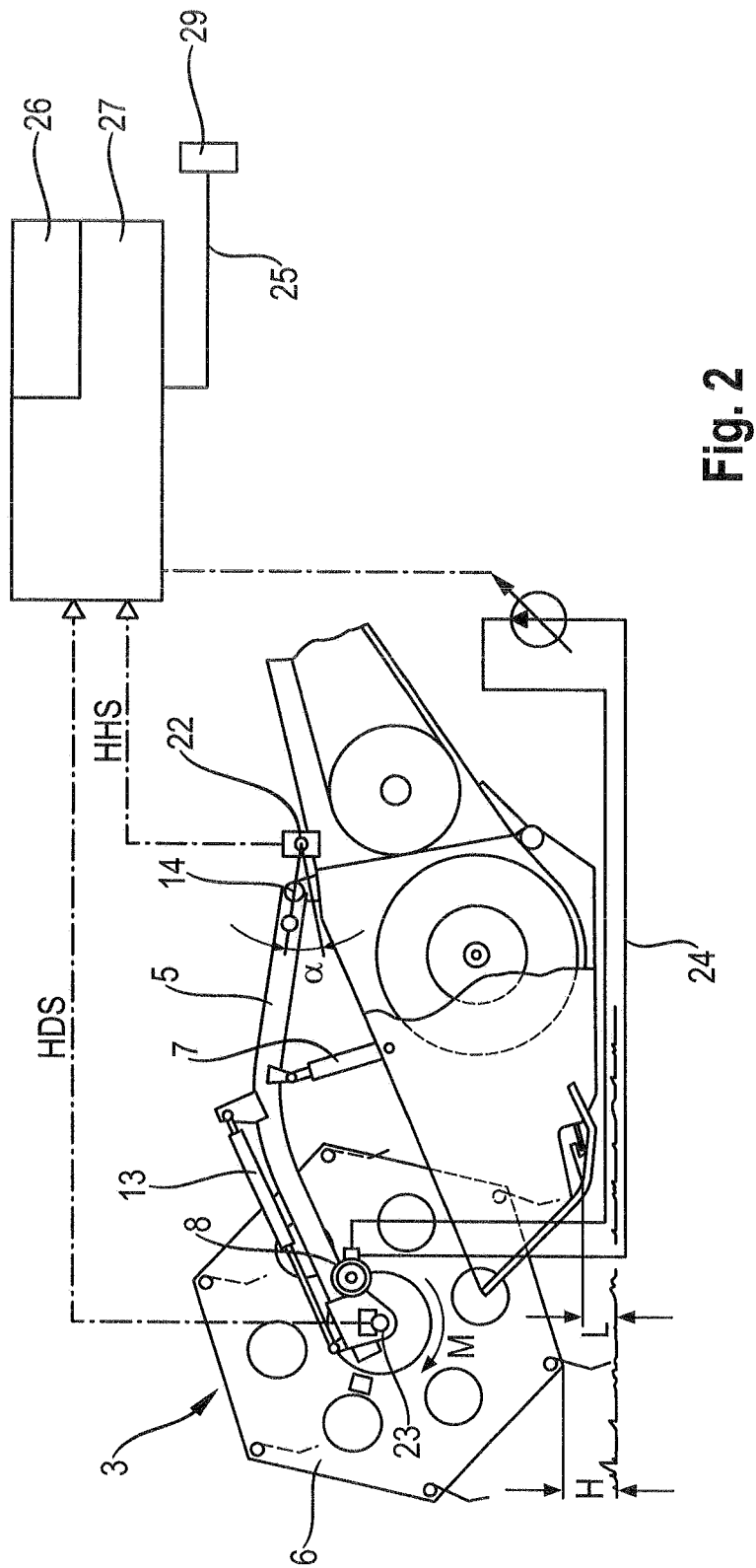
FIG. 2 presents an enlarged section of a header of the FIG. 1 self-propelled harvesting machine.

FIG. 1 presents a side view of a self-propelled harvesting machine embodied as a combine harvester 1, wherein a front attachment designed as header 3 is disposed on the intake chute 2 of the combine harvester, the intake chute swivelable in the vertical direction. The header 3 is adjustable to a desired cutting height L by the swivellable intake chute 2. The header 3 comprises a cutting table 4 and a reel 6, which is attached to the cutting table 4 at two vertically swivellable reel supporting arms 5. Two hydraulic cylinders 7 are articulated between the cutting table 4 and the reel supporting arms 5, to swivel the reel supporting arms 5, rotating about a pivot point 14 to change the vertical position of the reel 6. In addition, two further hydraulic cylinders 13 are installed between the reel supporting arms 5 and the reel 6 to adjust the position of the reel 22 in the horizontal direction relative to the cutting table 4, as shown in FIG. 2.

The reel 6 is driven in a rotating manner by a motor designed as a hydraulic motor 8 to thereby ensure that the crop is picked up continuously and is conveyed uniformly through the header 3 and the intake chute 2 to a threshing unit 9. The crop is cut by a finger bar 10 mounted on the front edge of the cutting table 4 and the cut crop is then conveyed, with the aid of the reel 6, to a rotationally driven intake auger 11 disposed in the cutting table 4. The intake auger 11 conveys the crop to the intake chute 2. A feed rake 12 runs in the intake chute 2 and conveys the crop further to the threshing unit 9. Disposed downstream of the threshing unit 9 is a separating device 15, which is in the form of a tray-type shaker in this case. Alternatively, the separating device 15 also may embody a separating rotor.

The crop output by the threshing unit 9 and the separating device 15 is fed to a cleaning unit 16, in which grain is separated from the remaining components of the crop and, the crop exiting the cleaning unit 16 proceeds via a so-called grain elevator 18 into a grain tank 17. In order to empty the grain tank 17, a grain-tank unloading device is provided with a grain-tank unloading tube 21 to transfer the grain to a self-loading forage wagon. The devices that are used to process or work the picked-up crop are referred to in the following as the working assemblies of the harvesting machine 1.

The working assemblies of the combine harvester 1 are controlled by a control device 28, which communicates with the working assemblies via a bus system 25 in order to control or regulate these working assemblies. The control device 28 comprises a display unit 30, a data processing device, and input means 31. The input means 31 may embody switches, control levers, a keyboard or a touchscreen, which are disposed on a control panel 32. Furthermore, a control unit 27 disposed on the header 3 is connected to the bus system 25 by coupling elements 26.

The combine harvester 1 comprises an internal combustion engine 20, which drives a ground drive for driving the front wheels 19 of the combine harvester 1, a threshing unit drive for driving the threshing unit 9, and a header drive for driving the header 3.

The remaining working assemblies of the combine harvester 1, such as the separating device 15 and the cleaning unit 16, also are driven by drives that are driven by the internal combustion engine. The ground drive can be operated independently of the threshing unit drive, the header drive, or the remaining drives that drive the working assemblies, thereby ensuring that, in the event of switching from the harvesting mode to the road-travel mode, the drives not required therefor can be shut off. The operator shuts off the working assemblies by making a related input via one of the input means 31.

In order to ensure optimal pick-up of the crop, the header 3 is mobile, i.e., the header 3 is guided vertically as well as in terms of the longitudinal tilt thereof. The vertical height adjustment, that is, the longitudinal tilt compensation in the direction of travel, and the change in the longitudinal tilt of the header 3 are implemented depending on the current ground level and, therefore used to obtain a uniform stubble height of the harvested crop.

FIG. 2 shows a section of the header 3 of the combine harvester 1 (depicted in FIG. 1), including the sensors 22, 23 disposed there and the control unit 27. The control unit 27 is equipped with a data memory 26 and a microprocessor and is used to control the header 3. The momentary reel height H of the reel 6 is measured by an angle-of-rotation sensor 22, which is mounted in the pivot point 14 and measures an angle-of-rotation of the reel supporting arms 5. A signal HHS generated by the angle-of-rotation sensor 22 is directly proportional to the reel height H.

The hydraulic motor 8 is driven by a hydraulic drive system 24. A pressure sensor 23 is installed in the hydraulic drive system 24, by which a hydraulic pressure is sensed, wherein this hydraulic pressure changes depending on the reel torque M. A signal HDS generated by the pressure sensor 23 is proportional to a load acting on the reel 6. The load on the reel 6 is determined by ascertaining the tensile force FH acting on the reel 6, which is defined by the reel torque M. The signals HHS and HDS are supplied to the control unit 27, which is connected to the angle-of-rotation sensor 22 and the pressure sensor 23 and controls the hydraulic drive system 24.

Furthermore, a header comprising a header trough having a fixed part and a moving part enables the length of the cutting table to be varied for the processing of various crop types. In order to change the position of the moving trough part of the header trough relative to the fixed trough part the reel must be prevented from colliding with the finger bar in any relative position of this finger bar. To this end, the position of the moving trough part relative to the fixed trough part is continuously ascertained and the minimum vertical position of the reel that is required in order to maintain a minimum separation between the reel and the finger bar is regulated according to the particular relative position by solenoid valves. A cam track is connected, in a simple manner, to the side panel of the moving trough part, wherein a sensor fastened to the reel interacts with this cam track. The sensor acts upon the solenoid valves of the piston cylinder unit provided to raise and lower the reel. The moving trough part and the reel also are controlled by the control unit on the header.

Figure 3:
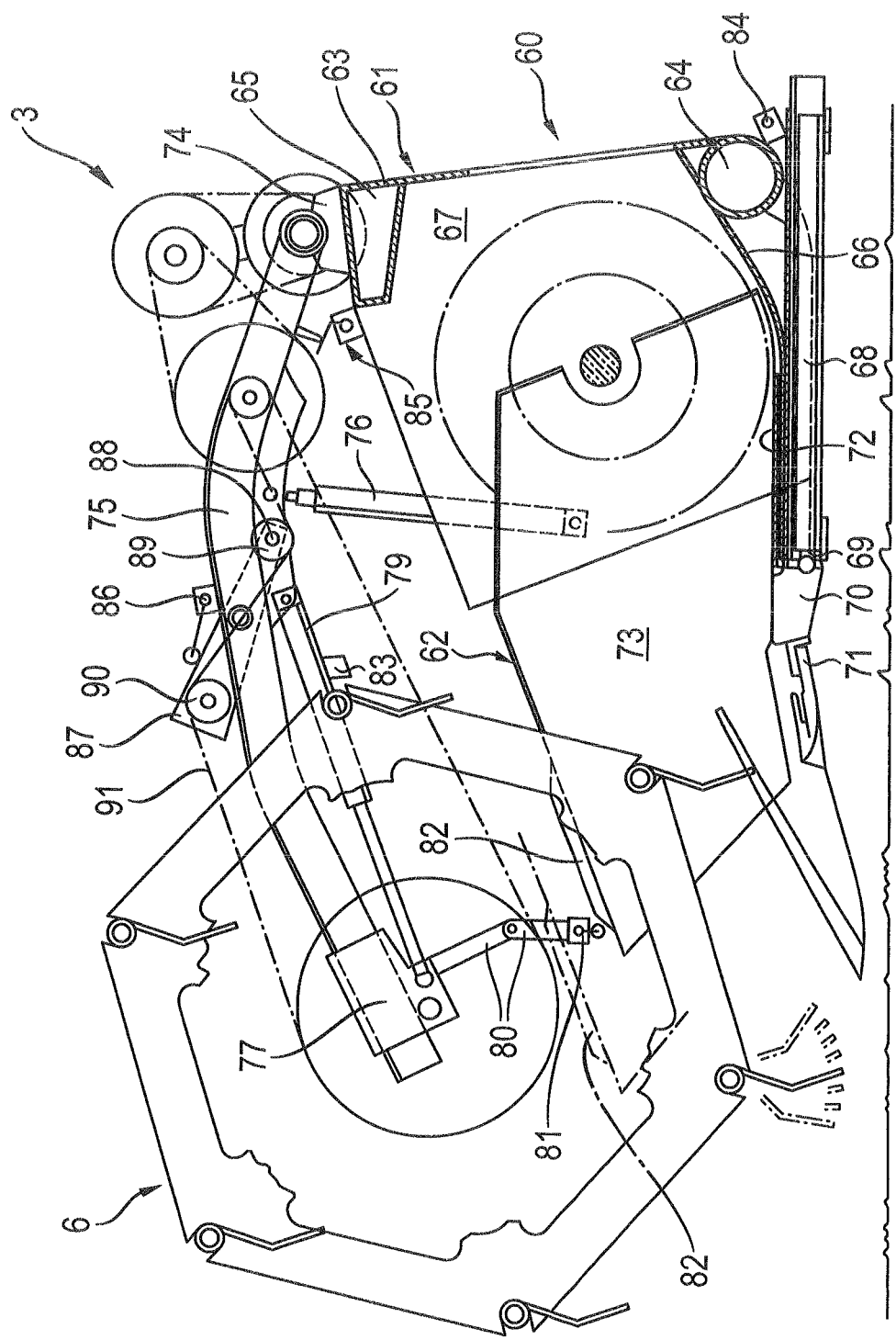
FIG. 3 presents a schematic view of a header having a variable-length header trough.

FIG. 3 shows a header 3 comprising such a header trough 60, which is formed of a fixed part 61 and a moving part 62. The fixed part 61 comprises a rear main frame 63, a carrier tube 64, and a reinforcing profile 65. The bottom plate 66 is fixedly connected to the main frame 63 via the carrier tube 64. The side panels 67 are connected to the bottom and to the main frame 63. A plurality of piston cylinder units 68 disposed with separation from one another is provided underneath the bottom plate 66, wherein the piston rods 69 of these piston cylinder units act on a cross-carrier 70 carrying the finger bar 71. A further bottom plate 72 is connected to the cross-carrier 70, wherein this bottom plate overlaps the bottom plate 76 shown in FIG. 3. Side panels 73 are connected to the bottom plate 72 and the carrier 70 and, therefore, the displaceable part 62 of the header trough 60 is formed by the bottom plate 72 and the side panels 77 with the carrier 70 and the finger bar 71. The position of the moving part 62 of the header trough 60 relative to the fixed part 61 of the header trough 60 is changed by actuating the piston cylinder units 68.

Supports 74, in which two supporting arms 75 disposed parallel to one another are supported, are screwed onto the reinforcing profile 65 of the fixed part 61 of the header trough 60. These supporting arms 75 are raised and lowered by piston cylinder units 76. Carriages 77 are placed onto the supporting arms 75, wherein the reel 6 is mounted in a drivable manner on these carriages. The carriages 77 are displaced back and forth on the supporting arms 75 via actuation of piston cylinder units 79. As shown in FIG. 3, a bellcrank 80 is fixedly connected to at least one carriage 77. The bellcrank carries a microswitch 81 on the end thereof remote from the carriage 77. A cam track 82 is dedicated to this microswitch 81, wherein this cam track is mounted on one of the side panels 73 of the moving part 62 of the header trough 60. If the piston cylinder units 68 are then actuated, the finger bar 71 extends toward the left, from the position shown in FIG. 3. The microswitch 81, along with the non-illustrated guide roller assigned thereto, runs on the track 82 and thereby actuates the microswitch 81.

The result of such an actuation is that the piston cylinder units 76 are actuated for "raising" until the microswitch 21 no longer has contact to the cam track 82. The operator can raise the reel 6 even further from this position by continuing to actuate the piston cylinder units 76. A solenoid valve 83 having switching selections for the positions "raise" and "lower" is dedicated to the reel 6. These two switching selections are controllable by the operator. Instead of the above-described mechanical solution for monitoring the reel position, an electrical solution can be provided. In the electrical solution, the functions of the carriage 77, the bellcrank 80 and the microswitch 81 are replaced by an electronic characteristic map for controlling the reel 6. The electronic characteristic map is stored in the control device 28.

Furthermore, a displacement sensor 84 is dedicated to at least one piston cylinder unit 68, which ascertains the extent by which the finger bar 71 has extended from the fully retracted position thereof and provides a corresponding signal. An angle-of-rotation sensor 85 is dedicated to at least one of the supporting arms 75 of the reel 6 to ascertain the particular angular position of the supporting arm 75 proceeding from a reference point and provides a corresponding signal. A further angle-of-rotation sensor 86 is mounted on at least one of the supporting arms 75 and is influenced by the particular angular position of a lever 87. This lever 87 is supported on the supporting arm 75 in a manner swivellable about a pivot axis 88. The lever 87 comprises guide rollers 89 and 90 at both ends, by which the drive chain 91 for the reel 6 is guided. The lever 87 is swivelled depending on the position of the carriages 77 of the reel 6 on the supporting arms 75, thereby influencing the angle-of-rotation sensor 86. The position of the lever 87 ascertained by the angle-of-rotation sensor 86 also is provided as a corresponding signal for the further processing. The reel-height control (which was described by reference to the header 3 shown in FIG. 2), also can be transferred (in a corresponding manner), to the header 3 shown in FIG. 3.

Figure 4:
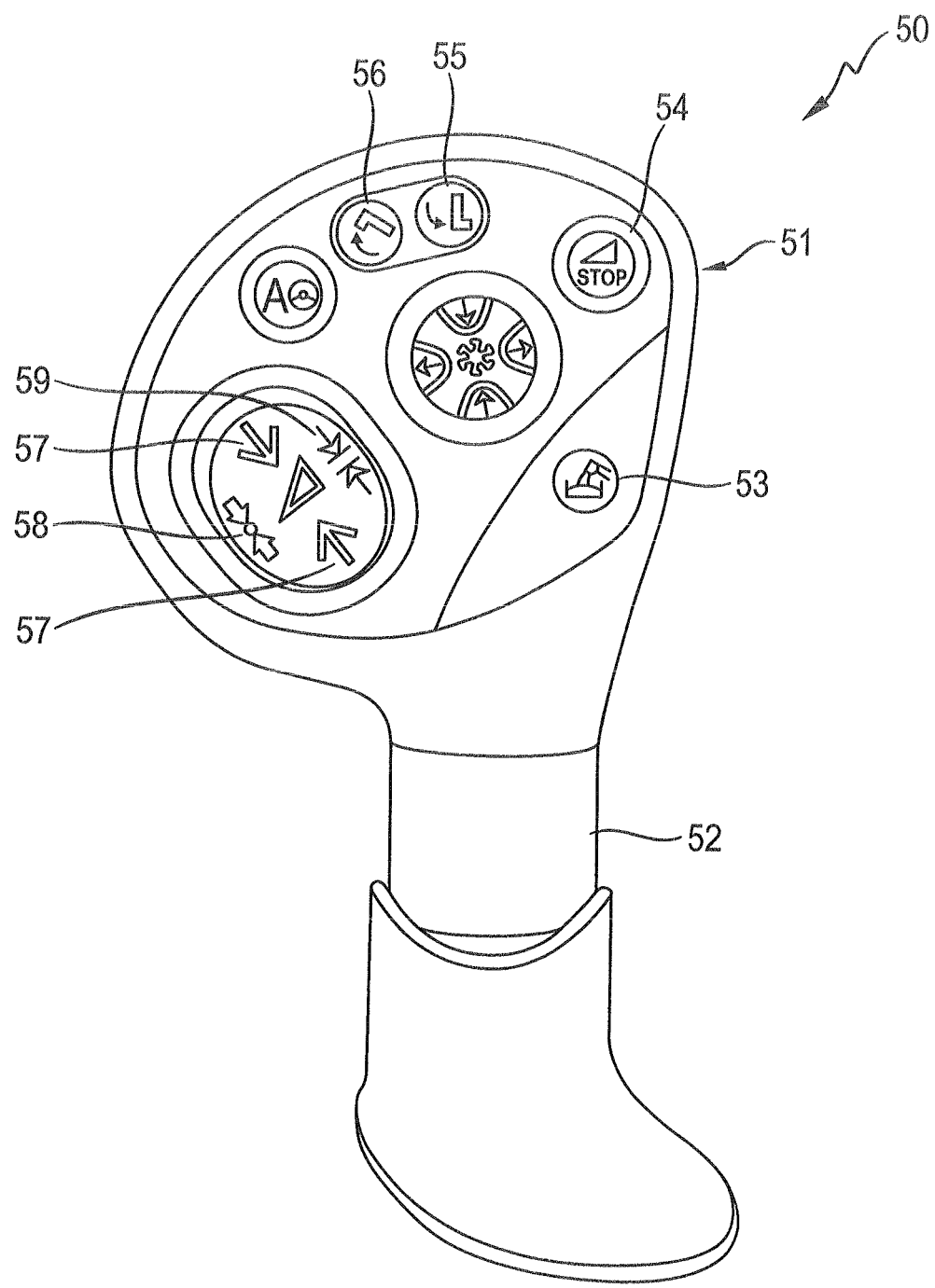
FIG. 4 presents a control lever of a self-propelled harvesting machine.

As described above, the input means 31 is designed, inter alia, as switches or control levers, to which specific functions are assigned in order to control the working assemblies. FIG. 4 shows a perspective view of a handle head 51 of an input means 31, which is embodied as a multifunction lever 50 and is used to control the combine harvester 1. A hollow neck 52 is integrally formed on the underside of the handle head 51 and accommodates a shaft of the multifunction handle 50 (not shown in FIG. 4) and connects the handle head 51 to a joint in the instrument panel. A plurality of switches 53, 54, 55, 56, 57, 58, 59 is disposed on the multifunction handle 50. The switches are used to control at least two working assemblies of the combine harvester 1, namely, the header 3 and the grain-tank unloading tube 21. For example, a switch 58 having a first function F1 specific for the working assembly "header 3", namely, the cutting-height control of the header 3, is dedicated to the control device 28 as the input means 31. A switch 59 has the default cutting height as the specific function F. The header 3 can be shut off by actuating the switch 54. Furthermore, a non-illustrated sliding switch is disposed on the handle head 51, which is used to retract and extend the moving part 62 of the header trough 60.

In addition, switches 53, 55 and 56 are disposed on the multifunction handle 50. The unloading of the grain tank is activated by the switch 53, while the switches 55 and 56 are used to swivel the grain-tank unloading tube 21 inward and outward.

Since the disposition of a plurality of switches or levers, as input means 31, on a control panel 32 of a self-propelled harvesting machine is overwhelming to an operator and, therefore, makes the handling of the harvesting machine more difficult, one or more input means 31 (each of which is assigned a specific first function F1 for controlling a working assembly) is assigned a second function F2. Second function F2 is specific for the corresponding working assembly, yet is available only when the harvesting machine is not in the "harvesting" operating state. The machine is not in a harvesting operating state when the harvesting machine is not ready to pick up and process crop due to a situation that was properly induced by the operator.

In the exemplary embodiment described herein, the switch 58 provided for controlling the cutting height is assigned the second function F2, which is that of transferring the header 3 into a transport position T or a parked position. In the transport position T, the variable-length header trough 60 and the reel 77 are fully retracted, and therefore the header 3 has the narrowest possible transport width when in the transport position T. In order to ensure that the switching between the first function F1 and the second function F2 of the switch 58 takes place exclusively in the situations intended therefor, the first function F1 and the second function F2 are assigned by the control device 28 only depending on a change in the operating state. In contrast, the first function F1 of the switch 59, the default cutting height, can be replaced by a second specific function F2, which is that of transferring the header 3 into the most recently stored working position thereof.

An operating-state change refers to the situation in which the operator manually shuts off the drives of the working assemblies. In the case of the header 3, this can be shut off in a targeted manner by actuating the switch 54 on the multifunction handle 50. Doing so ensures that an automatic assignment of the second function F2 instead of the first function F1 assigned to the input means 31 takes place only when a change in the operating state was explicitly initiated. The purpose thereof is to prevent an automatic assignment from taking place in the event of an emergency shutoff of a working assembly, for example, induced by a foreign object being picked up by the header 3, the detection of which initiates a quick stop.

The mode of operation is explained in the following by reference to the header 3 and the associated input means 31 for controlling the comparison of the lateral inclination and the vertical inclination of the header 3 due to a changing ground contour. During the harvesting operation, the reel 6 and the finger bar 10 have specific working positions A depending on the crop to be processed and the current harvesting conditions, in which said working conditions it is ensured that the tines of the reel 6 do not collide with the finger bar 10. As described above, the finger bar 10 is displaced together with the moving part of the header trough in order to assume a position that is adapted to the crop type. Due to the large working width of headers, headers are typically placed on a trailer so that the combination of combine harvester 1 and header 3 can travel on the road. In order to ensure that the header 3 is safely placed on the trailer, the reel 6 must be in a fully lowered position and, in the case of a variable-length header (as shown in FIG. 3), the moving part 62 of the header trough 60 is transferred into a retracted position.

For the purposes of transport, the header table 4 and the at least one reel 6 must assume a defined transport position T or parked position relative to one another in order to prevent damage to the header 3 and the trailer. In the transport position T, it also is ensured that the transport width permitted for travel on the road is not exceeded by the header 3, for example, due to the reel 6 not being fully retracted. A further problem that can occur if the reel 6 and the header table 4 do not assume the transport position T relative to one another is that there is no hydraulic oil in the hydraulic circuit of the combine harvester 1 after the header 3 has been decoupled therefrom.

The transfer into the transport position T is initiated by the actuation of various input means 31, one of which controls the change in length of the header table 4 and the other of which controls the position of the reel 6. The operator of the combine harvester 1 must therefore consciously make certain to actuate the input means 31 for a sufficiently long period of time until the reel 6 and the header table 4 have reached the particular transport position T thereof.

In order to prevent the aforementioned problems and increase operator comfort, the header 3 is automatically transferred into the transport position T depending on the ascertained operating state of the header 3 and of the combine harvester 1 upon actuation of an input means 31 of the control device 28. If the user has shut off the drives of the working assemblies in the interior of the combine harvester 1 because the harvesting procedure has ended and the header 3 shall be decoupled from the combine harvester 1, an automatic assignment takes place to the input means 31 having the second function F2. The second function F2 deviates from the first function F1 and is specific for the header 3 in an operating state deviating from the harvesting mode. Therefore, the second function F2 is assigned to the switch 58, which, in the harvesting mode, has the first function F1 of controlling the cutting height of the header 3, wherein this second function F2 is that of controlling the header 3 for the automatic transfer into the transport position T.

The current ground speed of the combine harvester 1 is also taken into consideration, for reasons of operating safety. To this end, a speed limit value is stored in the control device 28. If this speed limit value is exceeded or fallen below, the actuation mode of the input means 31 is directly affected in order to prevent endangering third parties by the transfer into the transport position T. If it is ascertained that the speed limit value has been exceeded, the input means 31 is briefly actuated in order to transfer of the header 3 into the transport position T thereof. If the actual ground speed corresponds to or falls below the speed limit value, then, for safety reasons, the operator must actuate the input means 31 in a sustained manner until the transport position T of the header 3 has been reached. In this situation, when the sustained actuation of the input means 31 is interrupted, the transfer procedure into the transport position T is immediately interrupted.

This procedure also can be applied similarly to the transfer of the header 3 into a working position A. After the header 3 has been picked up and coupled to the combine harvester 1 (that is, after the header 3 has been connected to the bus system 25 and to the hydraulic circuit of the combine harvester 1), the operating state of the combine harvester 1 is checked. If the working assemblies have been shut off, the second function F2 is assigned to the input means 31. The second function F2 controls the header 3 for the automatic transfer into the working position A. The working position A is defined as the most recently detected positioning of the reel 6 and the header table during the previous harvesting operation. This procedure also takes place with consideration for the current ground speed of the combine harvester 1.

Due to increasing header widths, the length of a grain-tank unloading device also must be adjusted in order to ensure that a corresponding transfer distance between the combine harvester 1 and a self-loading forage wagon can be implemented. Correspondingly, the grain-tank unloading device can comprise a multi-piece grain-tank unloading tube, wherein individual sections are telescopic relative to one another. Alternatively, the individual sections are connected to one another by one or more joints, about which said grain-tank unloading tube individual sections of the grain-tank unloading device can be swivelled opposite one another making it possible to obtain an overall length of the grain-tank unloading tube of the combine harvester 1 that is permissible for travel on the road. To this end, at least one section of the grain-tank unloading tube can be unfolded at an angle of 90° or more, preferably the section that is furthest away from the combine harvester during unloading. This section of the grain-tank unloading tube is then located in a transport position bearing against the combine harvester, in which the section extends, for example, transversely to the longitudinal axis of the combine harvester, while the remaining part of the grain-tank unloading tube extends parallel to the longitudinal axis.

The invention also controls the grain-tank unloading tube 21 working assembly, which can be transferred, via actuation of the two switches 55, 56 on the multifunction handle 50, out of a transport position T, in which the grain-tank unloading tube 21 bears entirely against the combine harvester 1 (as shown in FIG. 1), into the working position A thereof. In working position A, the grain-tank unloading tube extends parallel to the longitudinal axis of the combine harvester, or can be transferred into the grain-tank unloading position Ü thereof, in which the grain-tank unloading tube 21 extends substantially perpendicularly to the longitudinal axis of the combine harvester 1. A third switch 53 is used to switch a conveyor device located in the grain-tank unloading tube 21 on and off in order to unload the grain contained in the grain tank 17.

In order to increase the operator comfort, it is possible to assign a second function F2 to the third switch 53, for example, under certain operating conditions, wherein the switching on and off of the conveyor device is explicitly assigned, as the first function F1, to this third switch, wherein the function F2 is also specific for the grain-tank unloading tube 21. The second function F2 is that of automatically transferring the grain-tank unloading tube 21 into the transport position T thereof. In the simplest case, the transport position T of the grain-tank unloading tube 21 is limited to the grain-tank unloading tube 21 merely extending parallel to the longitudinal axis of the combine harvester 1. As described above, the second function F2 is assigned only when an operating state deviating from the harvesting mode is detected. Accordingly, the second function F2, which makes possible the automatic transfer of the grain-tank unloading tube 21 into the transport position T, is assigned to the third switch 53 only when the conveyor device of the grain-tank unloading tube 21 is deactivated by being shut off by the operator.

Figure 5:
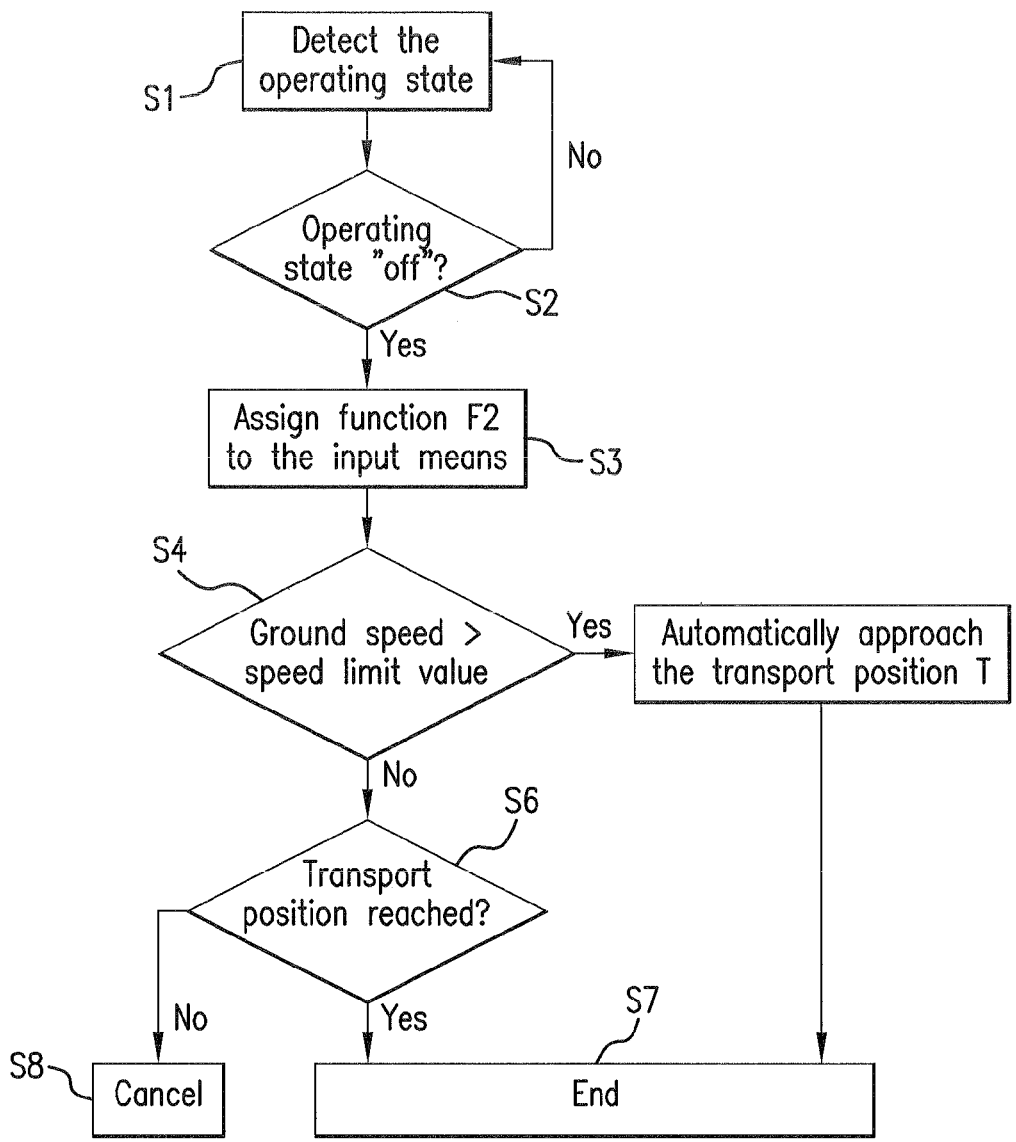
FIG. 5 presents a flow chart illustrating a method of invention.

The method for operating a harvesting machine (e.g., combine harvester 1), is hereinafter explained by reference to the flow chart shown in FIG. 5. First, in step S1, the current operating state of the harvesting machine is detected. In a step S2, a check is carried out to determine whether the current operating state of the harvesting machine corresponds to the operating state of the working assemblies being switched on or switched off in the harvesting mode. If the working assemblies are in the switched-on state, the detection is continued according to step S1. If it is determined, however, that the working assemblies are switched off, then, in a step S3, a second function F2 is assigned to the input means 31. The second function F2 is the switch 58 in the case of the header 3 or the switch 53 in the case of the grain-tank unloading tube 21. This second function F2 replaces the first function F1 assigned to the input means 31 in the "harvesting mode" operating state.

For reasons of operating safety, in a step S4, the current ground speed is compared to a speed limit value. If the speed limit value is passed, the input means 31, to which the second function was assigned is actuated briefly, in a step S5, in order to automatically approach the transport position T.

If the speed limit value is fallen below, the second function F2 is limited to the extent to which the input means 31 must be actuated, for the duration of the transfer into the transport position to transfer the working assembly into the transport position T. The sustained actuation of the input means 31 is verified in step S6, in that monitoring is implemented to determine when the transport position T is reached. The method ends when the transport position T has been reached.

If the actuation of the input means is interrupted during the transfer of the working assembly into the transport position T, however, the control is interrupted immediately and the working assembly is brought to a standstill, in step S8.

In addition, when the transport position T is reached, according to step S6, or cancelled, according to step S8, the assignment of the second function F2 may be "undone" and therefore the input means has the original function F1 once more.

LIST OF REFERENCE CHARACTERS 1 combine harvester
2 intake chute
3 header
4 cutting table
5 reel supporting arm
6 reel
7 hydraulic cylinder
8 hydraulic motor
9 threshing unit
10 finger bar
11 header auger
12 feed rake
13 hydraulic cylinder
14 pivot point
15 separating device
16 cleaning unit
17 grain elevator
18 grain tank
19 front wheels
20 drive engine
21 grain-tank unloading tube 22 angle-of-rotation sensor
23 pressure sensor
24 drive system
25 bus system
26 data memory
27 control unit
28 control device
30 display unit
31 input means
32 control panel
50 multifunction lever
51 handle head
52 hollow neck
53 switch for grain-tank unloading
54 switch for header off
55 switch for swivelling grain-tank unloading tube inward
56 switch for swivelling grain-tank unloading tube outward
57 switch to raise/lower the header
58 switch for cutting-height control
59 switch for default cutting height
60 header trough
61 fixed part
62 moving part
63 main frame
64 carrier tube
65 reinforcing profile
66 bottom plate
67 side panel
68 piston cylinder unit
69 piston rod
70 cross-carrier
71 finger bar
72 bottom plate
73 side panel
29 coupling element
74 support
75 supporting arm
76 bottom plate
77 carriage
79 piston cylinder unit
80 bellcrank
81 microswitch
82 cam track
83 solenoid valve
84 displacement sensor
85 angle-of-rotation sensor
86 angle-of-rotation sensor
87 lever
88 pivot axis
89 guide roller
90 guide roller
S1 step
S2 step
S3 step
S4 step
S5 step
S6 step
S7 step
S8 step
H reel height
L cutting height
M reel torque
HDS signal
HHS signal
A working position
T transport position As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for operating a self-propelled harvesting machine, comprising:
    using a control device assigned to the harvesting machine for controlling each of a plurality of working assemblies for processing picked-up crop, including that at least one working assembly of the working assemblies is controlled by an input means operatively connected to the control device having a specific first function (F1) in the harvesting mode;
    assigning a second function (F2), which deviates from the first function (F1), to the input means by the control device depending on an operating state change, wherein the second function (F2) is specific for the at least one working assembly in an operating state that deviates from the harvesting mode; and
    controlling the at least one working assembly according to the second function (F2) such that the working assembly is automatically transferred into a working position (A) or a transport position (T);
    wherein the working assembly is automatically transferred to the transport position (T) if a ground speed of the harvesting machines is determined to exceed a speed limit value.

2. The method according to claim 1, wherein a duration of actuation of the input means for the transfer into one of the two positions (A, T) is determined depending on the ground speed of the harvesting machine.

3. The method according to claim 2, wherein the duration of actuation of the input means is monitored.

4. The method according to claim 1, wherein the at least one working assembly is automatically transferred into the working position (A) that was stored by the control device as the last working position of the working assembly.

5. The method according to claim 1, wherein sensors are used for monitoring to determine when the working position (A) or the transport position (T) has been reached.

6. The method according to claim 1, wherein upon reaching the working position (A) or the transport position (T) and actuating the input mean, the first function (F1) is assigned to the input means.

7. A self-propelled harvesting machine, comprising:
    a plurality of working assemblies for processing picked-up crop;
    a control device assigned to the harvesting machine for controlling the working assemblies;
    input means for controlling at least one working assembly of the working assemblies that is operatively connected to the control device and has a specific first function (F1) in the harvesting mode;
    wherein a second function (F2), which deviates from the first function (F1), is assigned to the input means by the control device depending on an operating state change;
    wherein the second function (F2) is specific for the at least one working assembly in an operating state that deviates from the harvesting mode;
    wherein the second function (F2) automatically transfers the at least one working assembly into a working position (A) or a transport position (T);

wherein the working assembly is automatically transferred to the transport position (T) upon a determination that a ground speed of the harvesting machines exceeds a speed limit value.

8. The self-propelled harvesting machine according to claim 7, wherein the harvesting machine is a combine harvester.

9. The self-propelled harvesting machine according to claim 8, wherein the at least one working assembly is a header.

* * * * *